United States Patent [19]

Milburn, Jr.

[11] 4,338,918

[45] Jul. 13, 1982

[54] UNITARY STRUCTURE AND METHOD FOR UTILIZING SOLAR ENERGY

[75] Inventor: William W. Milburn, Jr., Boulder, Colo.

[73] Assignee: Thomas W. O'Rourke, Boulder, Colo.

[21] Appl. No.: 222,447

[22] Filed: Jan. 5, 1981

Related U.S. Application Data

[62] Division of Ser. No. 970,287, Dec. 18, 1978, Pat. No. 4,250,871.

[51] Int. Cl.³ ............................................. F24J 3/02
[52] U.S. Cl. .................................... 126/430; 126/435; 126/436; 126/452
[58] Field of Search ............... 126/430, 436, 437, 434, 126/435, 400, 429, 428, 437, 450, 417, 452, 419; 165/35

[56] References Cited

U.S. PATENT DOCUMENTS

| | | | |
|---|---|---|---|
| 2,484,127 | 10/1949 | Stelzer | 126/430 |
| 3,997,108 | 12/1976 | Mason | 126/430 |
| 4,029,258 | 6/1977 | Groth | 126/430 |
| 4,050,508 | 9/1977 | Buckley | 126/434 |
| 4,061,267 | 12/1977 | Lof | 126/430 |
| 4,063,546 | 12/1977 | Schmid et al. | 126/436 |
| 4,068,652 | 1/1978 | Worthington | 126/430 |
| 4,071,016 | 1/1978 | Henderson | 126/436 |
| 4,088,266 | 5/1978 | Keyes | 126/430 |
| 4,111,185 | 9/1978 | Swann | 126/436 |
| 4,183,350 | 1/1980 | Staudacher | 126/430 |
| 4,192,290 | 3/1980 | Jensen | 126/434 |
| 4,213,448 | 7/1980 | Hebert | 126/434 |
| 4,219,010 | 8/1980 | Van Heel | 126/430 |
| 4,246,888 | 1/1981 | Jarzenbeck | 126/430 |
| 4,251,291 | 2/1981 | Gomez | 126/430 |
| 4,257,399 | 3/1981 | Shonerd | 126/437 |

*Primary Examiner*—Daniel J. O'Connor
*Attorney, Agent, or Firm*—O'Rourke & Harris

[57] ABSTRACT

A structure and method for utilizing solar energy for heating including a unitary, preferably modular, unit adapted to form an outer surface of a building, and having therein a reservoir suitable for storing fluid heat storage medium. The structure includes an outer glazing, an energy absorbing surface spaced inwardly from the glazing, and a divider forming an absorber channel adjacent the back side of the absorber. Preferably, the storage reservoir is separated from the back side of the absorber by an insulating divider defining the absorber channel. The structure is preferably self-supporting with a stressed storage reservoir and may be incorporated in a structure as a unitary module supporting at least its own weight and often forming a structural, stressed portion of the building. In operation, air may be selectively conducted through the absorber channel to accumulate heat energy from the back side of the absorber and, optionally, conduct the heat energy directly to the building volume to be heated, or over the storage reservoir to accumulate and store the collected energy. When radiant energy is not available, air may be flowed over the storage reservoir to withdraw heat energy to be utilized for heating purposes.

10 Claims, 4 Drawing Figures

UNITARY STRUCTURE AND METHOD FOR UTILIZING SOLAR ENERGY

CROSS-REFERENCE TO RELATED APPLICATION

This application is a division of applicant's prior copending application Ser. No. 970,287 filed Dec. 18, 1978, which application has now been allowed, U.S. Pat. No. 4,250,871.

BACKGROUND OF THE INVENTION

1. Field of the Invention

The present invention relates generally to solar heating systems forming an integral portion of a building, and more particularly to an unusually advantageous solar heating system in which heat is collected and supplied to an integral storage reservoir including a fluid storage medium, the heat being collected by absorbtion of solar energy utilizing a greenhouse effect, and selectively withdrawn from the storage reservoir and/or from the absorber, by means of internal channels through which air may be selectively conducted.

2. Description of the Prior Art

The ever expanding awareness of the need for greater utilization of solar energy has given rise to a great many systems towards this end. The difficulties and drawbacks of the systems employed to utilize solar energy are not always apparent. For instance, in the so-called active systems, cost is currently an almost overwhelming deterrent. Typical of such multicomponent systems are those utilizing flat plate collectors, usually roof mounted, with fluid (either water or air) circulating systems to mechanically transfer heat from the flat plate collectors to a remote heat storage system, typically a large pile of rocks in the basement. Alternatively, a large tank of water or utectic salts may be employed. Such active systems employ heat storage means which are operated contrary to certain natural tendencies in that heat is collected on the roof and the heated fluid must be moved downward to storage. This necessitates substantial additional equipment and energy to mechanically transmit the heat against this natural thermo siphon flow. Also, the flat plate collectors generally must be supported by the roof or other structural members in the building. Extensive plumbing between the remote heat storage and the collector is required. Once heat is in the storage area, of course, further ducting is required to transmit the heat to the volumes where it is employed.

Other solar energy systems are of the so-called passive designs which are most typically represented by the Trombe Wall. The Trombe system utilizes a wall of thick masonary construction which is faced with glass or other radiant energy transmitting material spaced from the wall to accomplish a greenhouse effect. During the day, solar energy is absorbed and transmitted into the wall by conduction into the masonary. Heat is withdrawn from the wall primarily by convection with air flowing from within the building to the space between the outer surface of the wall and the transparent facing and then again into the structure from the top of the wall. A secondary heating mechanism involves radiant energy from the inner surface of the heated wall. While the Trombe system is most economical in that the masonary wall is usually a structural member of the building it serves, the drawbacks involve rather rapid loss of heat from the outer surface of the wall through cooling of the transparent panels by radiation at night. Heated air flows in contact with the cooled inner surface of the transparent panel. Also, when the interior of the building is warm, the Trombe Wall tends to overheat the building by radiating heat from the inner surface of the wall.

SUMMARY OF THE INVENTION

The present invention, which provides a heretofore unavailable improvement over previous solar energy devices and methods, comprises a method and structure which forms a portion of a building, in which the advantages of the active and passive systems, e.g., efficiency and low cost, respectively, are maintained while the disadvantages of each system are largely avoided. The structure preferably forms an easily handled structural, module unit which directly interfaces with conventional heating systems. The method and structure provide for an absorber having an integral heat storage reservoir adjacent thereto. Heat storage medium may be provided in the heat storage reservoir after the unit is in place. Accordingly, the great mass generally required for heat storage need not be coped with during the construction phase. However, after construction is complete, it is a simple matter to fill the reservoir with a fluid heat storage medium, either a flowable solid, such as a salt, or preferably a liquid, such as water.

More specifically, the structure involves an outer glazing, either single or double, transparent to radiant energy but substantially opaque to energy in the infrared portion of the spectrum. An absorber is positioned adjacent to, but spaced from the glazing with a divider, preferably insulating, defining a channel on the back side of the absorber. Finally, the heat storage reservoir is positioned on the back side of the divider in yet another flow channel. Ducting and dampers are provided to permit selective fluid flow behind the absorber and from there either to the volume to be heated or to the heat storage channel. Alternatively, dampers may be positioned to direct fluid flow over the heat storage reservoir and then through the conventional heating system to the building volume to be heated. Preferably a series of collector-storage units may be formed as modules and connected to a single power unit, though of course each unit may incorporate the ducting and blower of the power unit.

Accordingly, an object of the present invention is to provide a new and improved method and structure for utilizing solar heat which lends to ease of construction by providing for light weight, structural units which incorporate the more massive heat storage medium only after the units are in place.

Another object of the present invention is to provide a new and improved method and structure for utilizing solar energy which combines the heat utilization efficiency and control of an active system while providing many of the cost advantages of an inactive system.

Yet another object of the present invention is to provide a new and improved method and structure for utilizing solar energy in which the solar energy is utilized with a conventional heat distribution system directly from such compact collector-storage structures.

Still another object of the present invention is to provide a new and improved method and structure for utilizing solar energy in which the units are unitary collector-storage units having structural, self-supporting characteristics.

These and other objects and features of the present invention will become apparent from the following description.

DETAILED DESCRIPTION OF THE INVENTION

Figure 1:
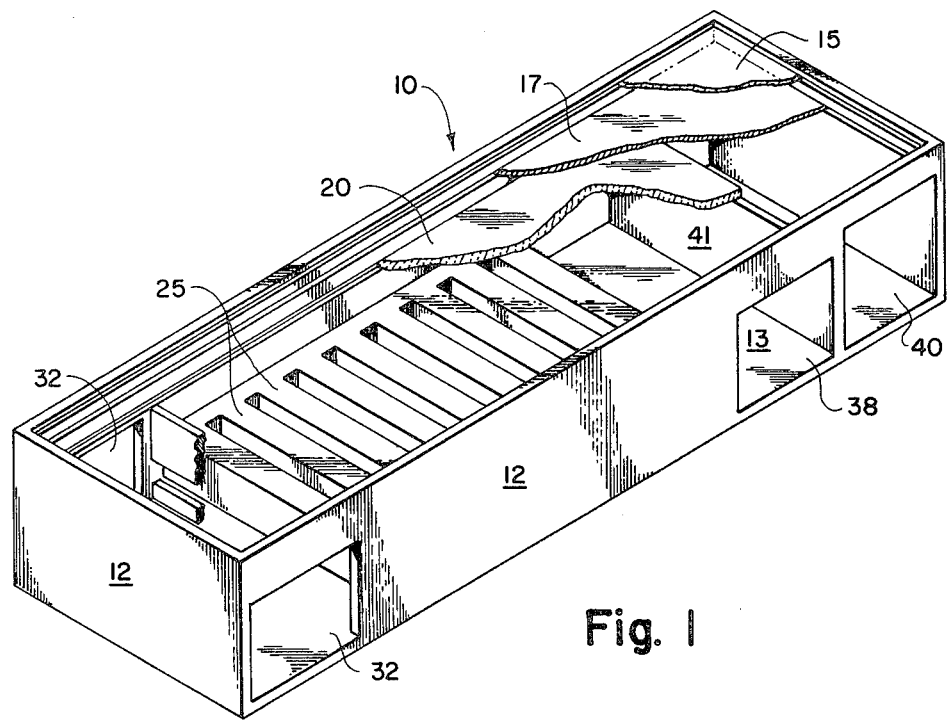
FIG. 1 is a perspective view of a partially cut away, preferred collector-storage module in accord with the instant invention.

Turning now to the drawings, wherein like components are designated by like reference numerals throughout the various figures, a typical collector-storage module for utilizing solar energy for building heating is illustrated in FIG. 1 and generally described by reference numeral 10. As shown, module 10 which may form the surface of a wall or roof of a building, includes side enclosures 12, which may be, for instance, sheet metal, rafters or other structural members of a building (not shown). Preferably side enclosures 12 are free-standing structural units which fit into and support not only module 10 but also lend structural support to the interfacing sections of the building in which module 10 is utilized. Back cover 13 encloses module 12 with side enclosures 12 on five sides.

Figure 2:
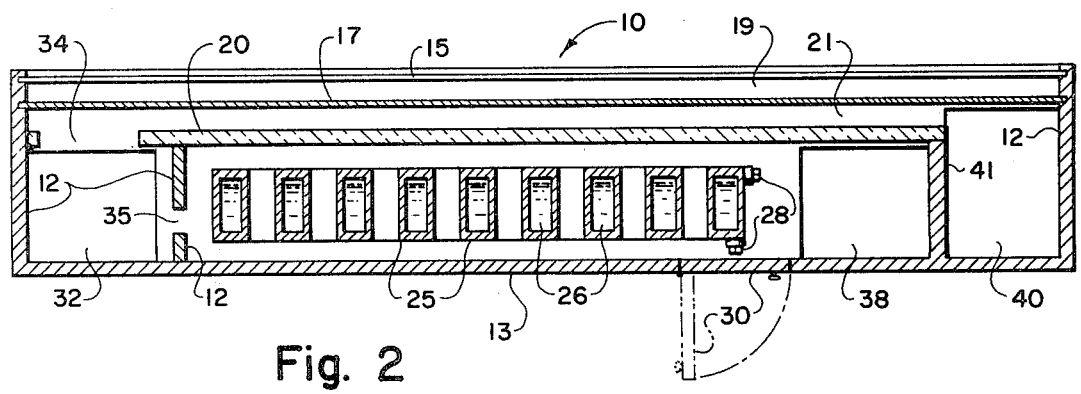
FIG. 2 is a sectioned, side view of the collector-storage module of FIG. 1.

At the open side of module 10, glazing 15, which may be glass, polymeric or other such material, is supported. Glazing 15 preferably is transparent or translucent to relatively short wavelength radiation, i.e., ultraviolet radiation as is common in solar energy but opaque to longer wavelength radiation such as infrared radiation which would be admitted by heated surfaces. This well known phenomenon is commonly referred to as the "greenhouse effect." Spaced inwardly from but adjacent to glazing 15 is absorber 17, as is particularly well illustrated in FIG. 2. Glazing 15 and absorber 17 form an insulating void 19 therebetween to minimize heat losses to the environment by conduction through glazing 15. The insulating effect may be enhanced by utilizing double panes of glazing 15 as is well known. Absorber 17 is preferably black at the side facing glazing 15, and may include corrugations to serve as wavetraps and induce turbulence to aid in heat transfer to fluid flowing over the absorber.

Divider 20 defines absorber channel 21 between absorber 17 and divider 20. Divider 20 is preferably of an insulating material, such as a foamed polymer or wood. Heat reservoir channel 23 is defined by, for instance, the other side of divider 20 and back cover 13. Channels 21 and 23 are adapted to flow a heat transport fluid, preferably air. Hollow heat reservoir 25 is disposed within heat reservoir channel 23 and is adapted to contain a fluid heat storage medium 26. Heat reservoir 25 may be, as illustrated, a multi-legged reservoir, or alternatively of a corrugated design to provide a relatively high surface area to enclose volume ratio. While heat reservoir 25 may be of plastic, or other such material, it is preferably formed of metal such as galvanized steel. Strength may be provided by attaching heat reservoir 25 to the side enclosure surfaces 12 of module 10 thus stressing heat reservoir 25. Heat storage medium 26 need only be flowable, i.e., a liquid or granulated material in order that it may be introduced into heat reservoir 25 through inlet 28. Inlets 28 are preferably oriented so as to be accessible through access door 30 defined in back cover 13.

Figure 3:
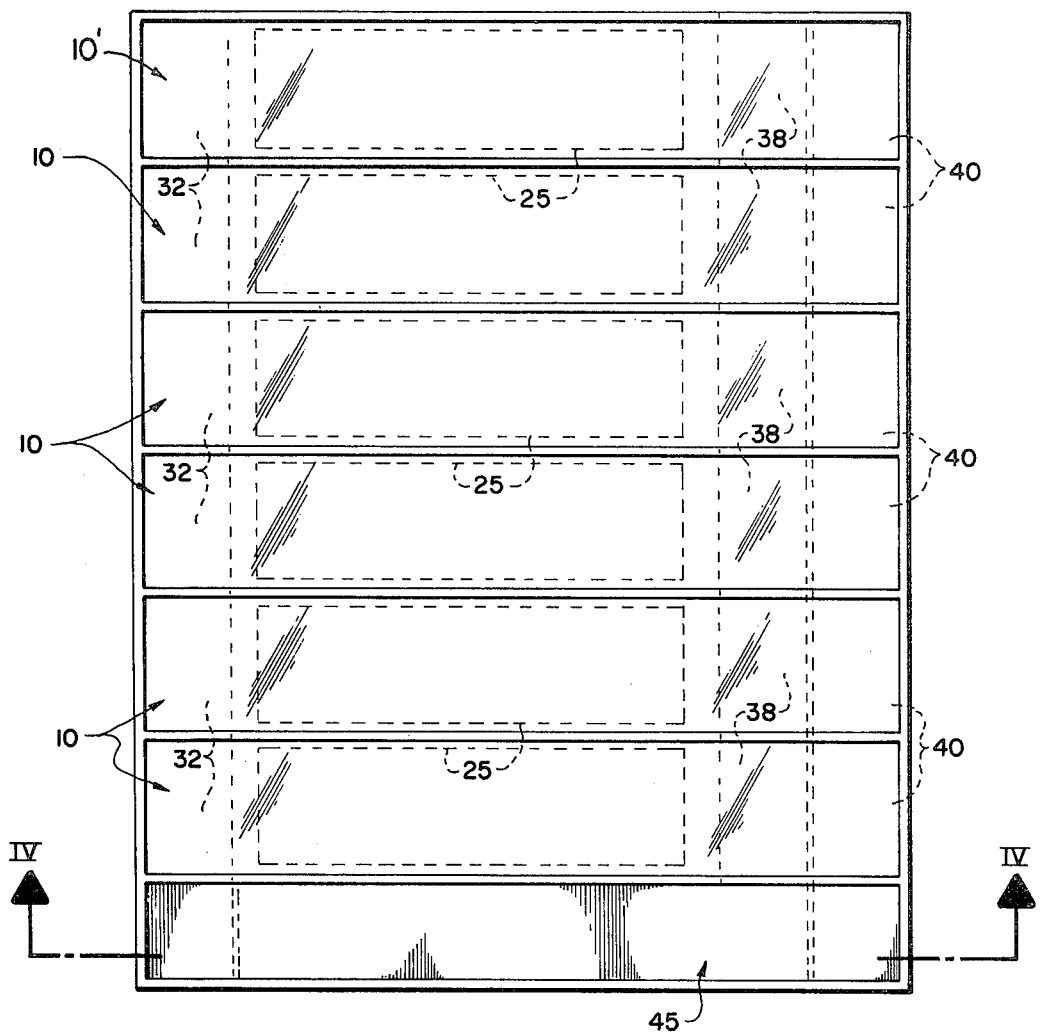
FIG. 3 is a top view of a series of the collector-storage modules of FIG. 1 in conjunction with a power module.

Collector-storage module 10 includes a return air duct 32 which is in communication with absorber channel 21 through opening 34 and also in communication with heat reservoir channel 23 to opening 35. Return air duct 32 extends substantially through module 10 except in the instance of an end module 10' as shown in FIG. 3, in which instance duct 32 extends only through one side of module 10'. In this manner, return air duct 32 runs through the length of joined modules 10. Openings 34 and 35 may be of increasing dimensions along joined modules 10 in order to promote relatively equal flow through the modules within large openings 34 and 35 compensating for the more remote location of certain of modules 10. Such sizing is well known and conventional in the art of duct sizing.

Modules 10 and 10' also include heat reservoir duct 38 and absorber duct 40 defined by partition 41 in the end portions thereof in a manner similar to that in which return air duct 32 is formed as described above. Accordingly, when a plurality of modules 10 are joined together with ducts 32, 38 and 40 interfacing, as shown in FIG. 3, and further joined with an end module 10', ducts 32, 38, and 40 form a continuous duct system throughout modules 10 and 10'. While ducts 32, 38 and 40 are illustrated as being formed in the side walls of module 10, external ducting may, of course, be employed. External ducts are useful when modules 10 and 10' are positioned between rafters, thus blocking direct connections between modules 10 and 10'.

Figure 4:
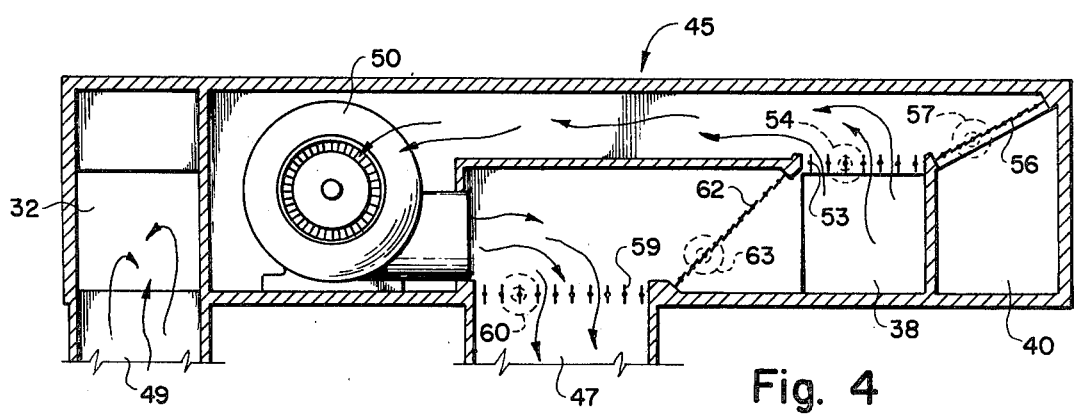
FIG. 4 is a sectional view along section line 4—4 of the power module shown in FIG. 3.

Power unit module 45, as shown in detail in FIG. 4, abuts the end of the ganged collector storage modules 10 and 10' as shown in FIG. 3. With reference to FIG. 4, it is to be noted that power module 45 includes a continuation of return air duct 32, heat reservoir duct 38 and absorber duct 40. Also defined therein are heated air outlet 47 and return air inlet 49. Heated air outlet 47 communicates directly with a conventional heat supply duct system in a building, and return air inlets 49 similarly interface with conventional cold air return. This latter aspect is conventional and not specifically illustrated.

Blower 50 is positioned in power unit module 45 and communicates at the inlet side with heat reservoir duct damper 53, operably by servo 54 and absorber duct damper 56, operable by servo 57. Dampers 53 and 56 may be selectively opened or closed to enable blower 50 to selectively draw heat from heat reservoir 38 and/or absorber duct 40. The outlet of blower 50 communicates with heated air outlet damper 59, operably by servo 60 and heat storage mode damper 62, operably by servo 63. Accordingly, the outlet from blower 50 may be selectively routed to heated air outlet 47, and thus to a conventional heat supply system.

The inlet of blower 50 may be selectively connected to heat reservoir duct 38 and/or absorber duct 40 by appropriate positioning of heat reservoir duct damper 53 and absorber duct damper 56. In this manner, heat may be supplied to the conventional heating system from absorber 17, and/or from heat storage reservoir 25.

In the event heat is available at absorber 17 but not required to heat the subject building, heat storage damper 62 may be opened and absorber duct 56 also opened. This, with the other dampers closed, will induce a closed route circulation from the back side of absorber 17, through absorber duct 40, through blower 50, then through duct 38 to heat storage reservoir 25 and, through opening 34, again past the back side of absorber 17. In this manner, heat is supplied to heat storage medium 26 to be maintained until required to heat the building.

The following table illustrates the more preferred modes of operation:

| | DAMPERS | | | |
|---|---|---|---|---|
| | Heat Reservoir Duct 53 | Absorber Duct 56 | Heat Air Outlet 59 | Heat Storage 62 |
| Heat from absorber to heating system | Closed | Open | Open | Closed |
| Heat from absorber and storage to heating system | Open | Open | Open | Closed |
| Heat from storage to heating system | Open | Closed | Open | Closed |
| Heat from absorber to storage | Closed | Open | Closed | Open |

Power unit module 45 may be positioned in other than the end position by appropriate ducting. Additional blowers may be provided in larger installations.

From the above description, it would be apparent that modules 10, 10′ and 45 may be conveniently prefabricated, readily assembled at a building site in place to lend structural support to the building. Rather than providing extensive plumbing and pumps through the building to remote storage, the method and structure described provides for a direct interfacing of the heat collection and storage module with conventional heat distribution means. If desired, hot water may also be provided by interfacing, either directly or through heat exchangers, with the heat storage means. While it is preferred that heated air be employed as the primary heat transfer fluid, hot water may be withdrawn for heating purposes from the reservoir, or merely as a preheat for domestic hot water. Since it is generally contemplated that solar heating systems be sized to provide less than the entire heat load during extremely cold periods or cloudy periods, a backup heating system will generally be provided and may, if desired, be incorporated in the solar collector-storage system described. However, such features are essentially conventional and well within the skill of the art to provide either within the solar collector-storage system as described, or within the conventional heat distribution system. Other conventional features, such as means to vent the absorber in the instance of overheating during, for instance, summer months are contemplated but not specifically disclosed. A temperature responsive dampler at the volume between the absorber and glazing serves this end.

In summary, the instant invention provides a method and structure whereby integral collector-storage modules may be readily handled during construction, preferably lending actual structural support to and forming a surface of the building in which they are employed. The more massive heat storage medium, such as water or a flowable solid, may be added to the otherwise easily handled modules after the modules are in place, and the modules may be directly connected to conventional heat distribution systems without the complication of remote storage of the heat relative to the collector.

Although only limited embodiments of the present invention have been illustrated and described, it is anticipated that various changes and modifications will be apparent to those skilled in the art, and that such changes may be made without departing from the scope of the invention as defined by the following claims.

I claim:

1. A method for operating a unitary structure for absorbing and storing solar energy, the method comprising:

positioning at the outer surface of a building a modular enclosure including glazing transparent to solar energy at an outer surface thereof, an absorber adjacent the glazing and within the enclosure, and an empty, self-contained hollow heat reservoir adjacent the absorber and also within the enclosure;

structurally securing the modular enclosure to the building;

filling the heat reservoir with a flowable heat storage media after the module is positioned and structurally secured to and reinforced by the building;

flowing a heat transfer fluid first over an absorber surface and then to the heat transfer reservoir to thus withdraw heat energy from the absorber and invest the heat energy in the heat reservoir and heat storage mechanism therein; and thereafter flowing a heat transfer fluid over the heat reservoir and then into the interior of the building to withdraw heat from the heat reservoir and supply the stored heat energy to the interior of the building;

whereby heat may be collected and stored in a unitary modular enclosure supported by the building, which modular enclosure need not support the weight of the heat storage media until structurally supported by the building.

2. A method for operating a unitary structure for absorbing and storing solar energy as set forth in claim 1 in which the heat storage media comprises water.

3. A method for operating a unitary structure for absorbing and storing solar energy as set forth in claim 1 in which the heat transfer fluid is air.

4. A method for operating a unitary structure for absorbing and storing solar energy as set forth in claim 1 in which the heat transfer fluid flowing from the absorber to the heat reservoir is diverted to the interior of the building to provide direct heating of the interior of the building.

5. A method for operating a unitary modular enclosure for absorbing and storing solar energy to heat a building, the enclosure including glazing transparent to solar energy at an outer surface of the enclosure, an absorber adjacent the glazing and within the structure, and a self contained hollow heat reservoir containing a heat storage medium therein positioned adjacent the absorber and within the enclosure, the method comprising:

absorbing solar energy passing through the glazing at the absorber to produce sensible heat;

transferring the sensible heat from the absorber to a heat transfer fluid;

selectively flowing the heat transfer fluid from the absorber to the adjacent heat storage reservoir to invest heat therein in the instance of excess available energy, and then back to the absorber, and terminating flow of the heat transfer fluid from the absorber in the absence of solar energy and initiating a flow path of heat transfer fluid from the interior of the building to the heat storage reservoir to withdraw sensible heat from the reservoir and then flowing the heat transfer fluid to the interior of the building.

6. A method for operating a modular enclosure as set forth in claim 5 in which the heat storage medium within the self contained hollow heat reservoir comprises water and the heat transfer fluid comprises air.

7. A method for operating a modular enclosure as set forth in claim 5 in which the heat transfer fluid is flowed from the back of a plurality of absorbers contained within a plurality of similar modular enclosures, through a power unit including fan means and heat transfer fluid valving means, and from the power unit to a plurality of heat storage reservoirs within the enclosure, whereby a plurality of modular enclosures may be interconnected and operated with a single power unit.

8. A method for operating a modular enclosure as set forth in claim 5 in which the modular enclosure is secured to the external surface of a building.

9. A method for operating a modular enclosure as set forth in claim 8 in which the modular enclosure is secured to the building with the self contained hollow heat reservoir empty, and, after being secured to the building, the heat storage medium is flowed into the reservoir, whereby the weight of the modular enclosure is minimum during handling and installation, and provided with the more dense heat storage medium only after being secured to and supported by the building.

10. A method for operating a unitary, modular enclosure for absorbing and storing solar energy for use in heating a selected volume, the enclosure including at least one layer of glazing transparent to solar energy at an outer surface thereof, an absorber adjacent the glazing and within the enclosure, and a self contained, hollow heat reservoir including therein a flowable heat storage medium positioned within the enclosure and adjacent the absorber, the method comprising:

passing radiant solar energy when available through the glazing and absorbing the solar energy upon the absorber to produce sensible heat;

transferring the sensible heat from the absorber to a heat transfer fluid;

selectively flowing the heat transfer fluid from the absorber to at least one of the heat storage reservoirs and a heating system adapted to provide sensible heat to the selective volume; and terminating flow of heat transfer fluid from the absorber in the absence of radiant solar energy and initiating a flow of heat transfer fluid in the heating system from the volume to be heated to the heat storage reservoir and back to the volume to be heated to withdraw sensible heat from the reservoir and provide such heat to the volume to be heated.

* * * * *